United States Patent [19]
Mori et al.

[11] Patent Number: 5,582,749
[45] Date of Patent: Dec. 10, 1996

[54] LASER BEAM MACHINE AND LASER BEAM MACHINING METHOD

[75] Inventors: Atsushi Mori; Yoshinori Nakata, both of Minamitsuru-gun, Japan

[73] Assignee: Fanuc, Ltd., Minamitsuru-gun, Japan

[21] Appl. No.: 335,823

[22] PCT Filed: Mar. 29, 1994

[86] PCT No.: PCT/JP94/00516

§ 371 Date: Nov. 16, 1994

§ 102(e) Date: Nov. 16, 1994

[87] PCT Pub. No.: WO94/23887

PCT Pub. Date: Oct. 27, 1994

[30] Foreign Application Priority Data

Apr. 7, 1993 [JP] Japan .................. 5-080399

[51] Int. Cl.$^6$ .................. B23K 26/14
[52] U.S. Cl. .................. 219/121.84; 219/121.67; 219/121.72
[58] Field of Search .................. 219/121.67, 121.68, 219/121.69, 121.72, 121.84

[56] References Cited

U.S. PATENT DOCUMENTS

| | | | |
|---|---|---|---|
| 3,604,890 | 9/1971 | Mullaney et al. | 219/121.67 |
| 3,965,328 | 6/1976 | Locke | 219/121.72 |
| 4,871,897 | 10/1989 | Nielsen | 219/121.67 |
| 5,059,759 | 10/1991 | Kudo et al. | 219/121.67 |

FOREIGN PATENT DOCUMENTS

| | | | |
|---|---|---|---|
| 55-141392 | 11/1980 | Japan | 219/121.84 |
| 59-87995 | 5/1984 | Japan | 219/121.84 |
| 60-54839 | 12/1985 | Japan | 219/121.72 |
| 1-95890 | 4/1989 | Japan . | |
| 4-200888 | 7/1992 | Japan | 219/121.67 |

*Primary Examiner*—Geoffrey S. Evans
*Attorney, Agent, or Firm*—Staas & Halsey

[57] ABSTRACT

A laser beam machine which makes it possible to diagonally cut a workpiece by the use of a laser beam. The laser beam (1) is condensed by a condensing lens (1a) and irradiated diagonally to a workpiece (5). An assist gas nozzle (3) is held perpendicularly to the workpiece (5), and an assist gas (3b) introduced via an assist gas-introducing port (3a) is jetted via an open end of the assist gas nozzle (3) against the cutting point (5a) on the workpiece (5) from above. By perpendicularly blowing the assist gas (3b) against the workpiece, sufficient pressure of the assist gas is applied to the cutting point (5a), whereby when a groove (5b) is formed through shifting of the cutting point (5a) as the diagonal cutting proceeds, the assist gas (3b) is constantly supplied through the groove (5b) to the optimum degree. At each cutting point (5a), the laser beam (1) diagonally irradiated and the assist gas (3b) perpendicularly blown cause thermal and chemical reactions of a metal to melt same, while molten metal is immediately removed by the assist gas (3b). As a result, the diagonal cutting of the workpiece proceeds smoothly.

5 Claims, 3 Drawing Sheets

LASER BEAM MACHINE AND LASER BEAM MACHINING METHOD

TECHNICAL FIELD

This invention relates to a laser beam machine and a laser beam machining method for machining a workpiece by condensing a laser beam, and more particularly to a laser beam machine and a laser beam machining method for diagonally cutting a workpiece.

BACKGROUND ART

Conventionally, a laser beam machine has been employed for cutting various kinds of materials. In most cases, the laser beam machine is employed for cutting off a workpiece by irradiating a laser beam perpendicularly to a surface of the workpiece. The cutting of the workpiece is carried out by irradiating the laser beam while blowing an assist gas to the cutting point. During the cutting, the direction of irradiation of the laser beam and the direction of blowing of the assist gas are made coincident with each other.

In welding two steel plates by holding them abutting on each other at ends thereof, each of the ends for welding is subjected to so-called edge preparation in advance, and then faces of the ends beveled by the edge preparation are caused to abut on each other to weld the two steel plates. To effect the edge preparation by using the laser beam, the laser beam is irradiated diagonally to the surface of each steel plate.

However, even if the laser beam is irradiated diagonally to the steel plate, the laser beam only shaves off the surface of the steel plate but cannot diagonally cut off the steel plate. Particularly, it is very difficult to diagonally cut off steel plates having a thickness of 6 mm or larger.

FIG. 3 illustrates an example of diagonal cutting by the conventional method described above. In the figure, a laser beam condensed by a condensing lens 102 is emitted via a machining nozzle 101 onto a steel plate 5, while an assist gas introduced via an assist gas-introducing port 103 is blown via the machining nozzle 101 against the steel plate 5. The direction of irradiation of the laser beam and the direction of blowing of the assist gas are thus made coincident toward the steel plate 5, by the machining nozzle 101. As described above, if the direction of irradiation of the laser beam and the direction of blowing of the assist gas are coincident with each other, and both of them are caused to impinge on the steel plate 5 in a diagonal direction, the laser beam cannot enter the steel plate deeply in the diagonal direction, but ends in shaving off the surface of the steel plate 5. This is because both the laser beam and the assist gas are reflected from the surface of the steel plate 5. Therefore, it has been difficult to perform the edge preparation of the steel plate 5 by the use of the laser beam.

DISCLOSURE OF THE INVENTION

The present invention has been made in view of these circumstances, and the object thereof is to provide a laser beam machine and a laser beam machining method each of which makes it possible to smoothly perform diagonal cutting of a workpiece.

To solve the above problems, the invention provides a laser beam machine for machining a workpiece by condensing a laser beam, which comprises a condensing optical system for condensing and irradiating the laser beam diagonally to the workpiece; and an assist gas nozzle for blowing an assist gas perpendicularly against the workpiece at a cutting point on the workpiece.

The laser beam is irradiated diagonally to the workpiece and the assist gas is blown perpendicularly against the workpiece at the cutting point thereon. By blowing the assist gas perpendicularly against the workpiece, sufficient pressure of the assist gas is applied to the cutting point, so that even when diagonal cutting proceeds, the assist gas is constantly supplied to the cutting point to the optimum degree. Therefore, at the cutting point, the laser beam and the assist gas cause thermal and chemical changes of a metal to melt same, and molten metal is immediately removed by the assist gas. As a result, the diagonal cutting of the workpiece proceeds smoothly.

BEST MODE FOR CARRYING OUT THE INVENTION

An embodiment of the present invention will now be described with reference to the drawings.

Figure 1:
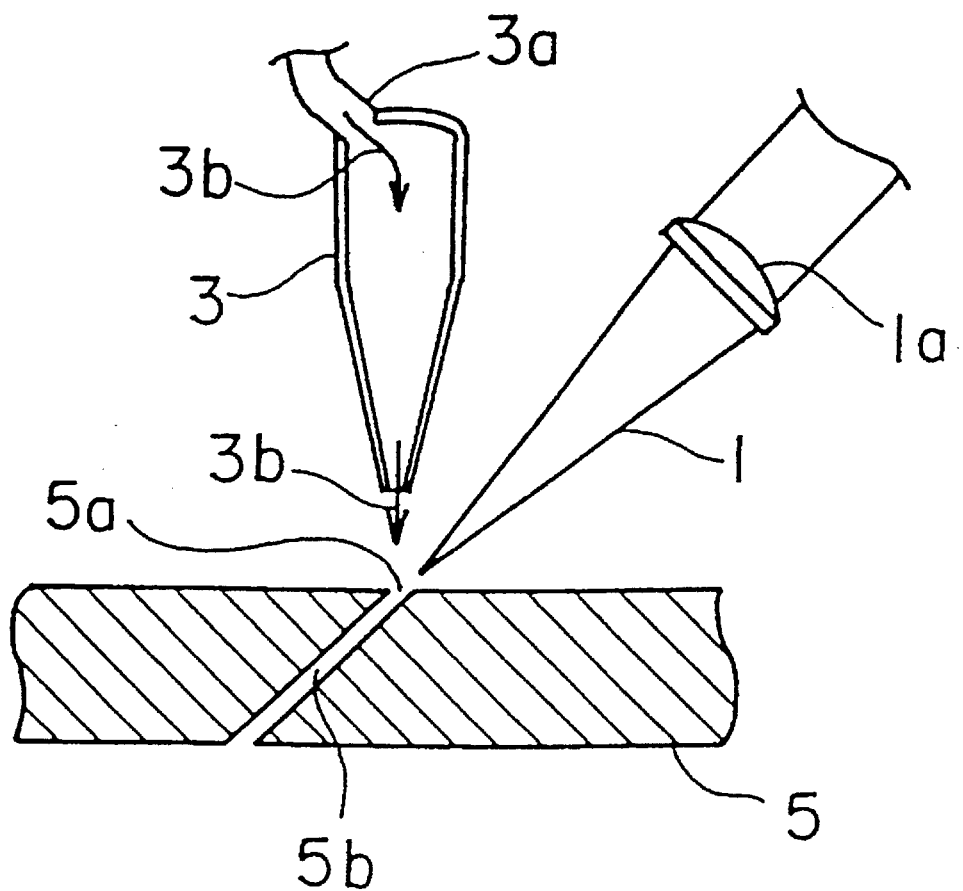
FIG. 1 is a diagram showing principles of construction of a machining head according to the present invention.

FIG. 1 shows principles of construction of a machining head according to the invention. In the figure, a laser beam 1 is condensed by a condensing lens 1a and emitted in a diagonal direction toward a workpiece 5. Further, an assist gas nozzle 3 is held perpendicular to the workpiece 5, and an assist gas 3b introduced via an assist gas-introducing port 3a is jetted via an open end of the assist gas nozzle 3 to be blown against a cutting point 5a on the workpiece 5 from above.

Thus, by blowing the assist gas 3b perpendicularly against the workpiece 5, sufficient pressure of the assist gas is applied to the cutting point 5a. Further, even when the cutting point 5a moves as the diagonal cutting proceeds to form a groove 5b, the assist gas 3b is constantly supplied through the groove 5b to the optimum degree. At each position of the cutting point 5a, the laser beam 1 diagonally irradiated and the assist gas 3b perpendicularly blown cause thermal and chemical changes of a metal to melt same, and molten metal is immediately removed by the assist gas 3b. As a result, the diagonal cutting of the workpiece 5 proceeds smoothly.

Figure 2:
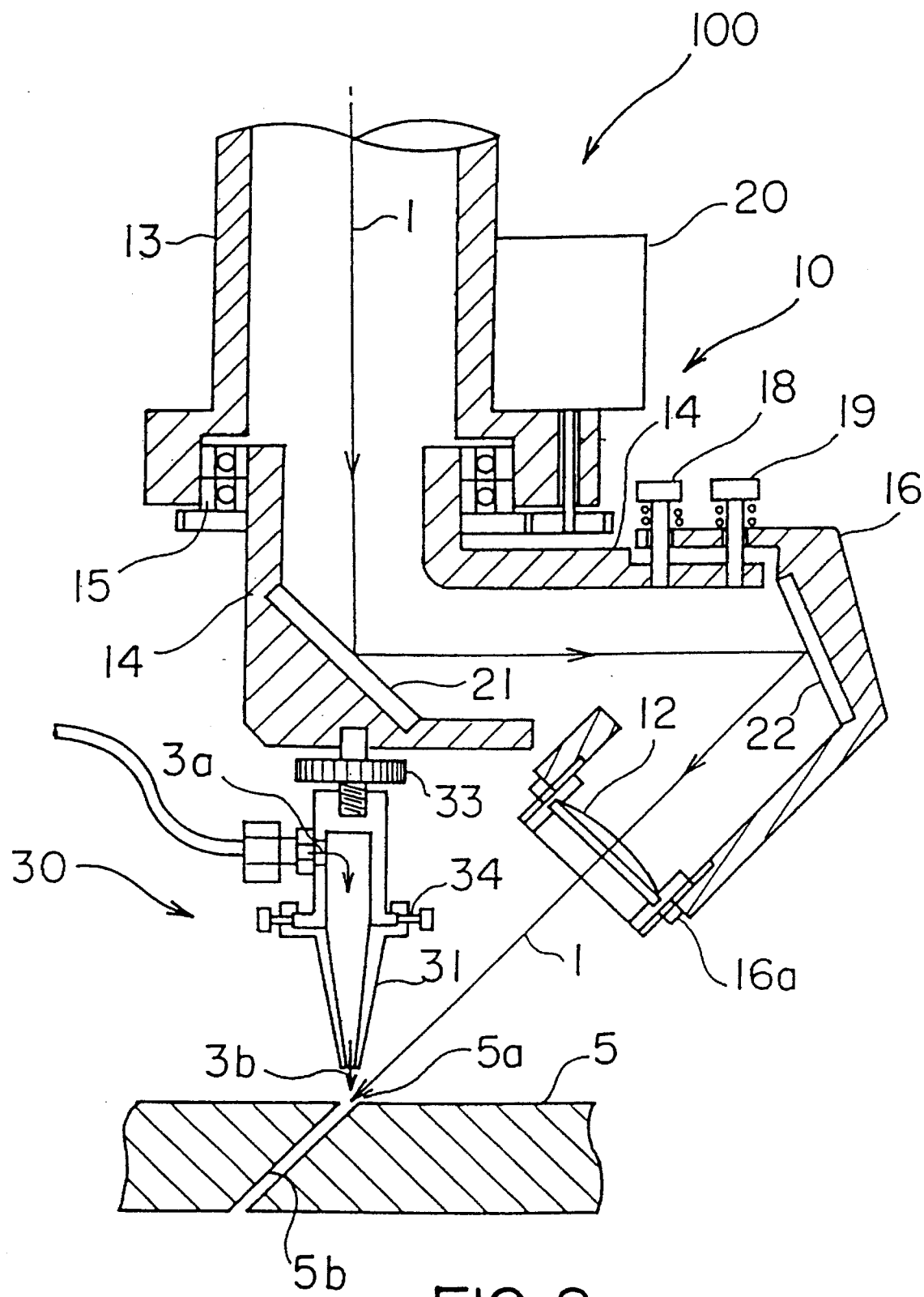
FIG. 2 is a diagram showing details of construction of the machining head according to the invention.
Figure 3:
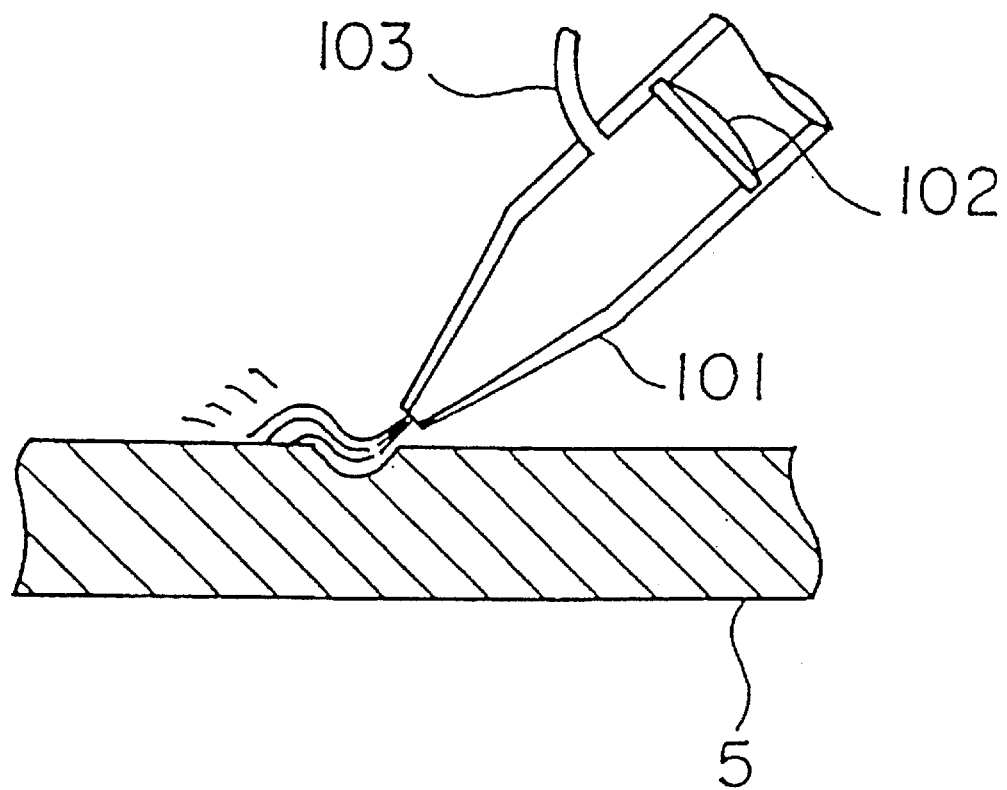
FIG. 3 is a diagram showing an example of diagonal cutting by a conventional method.

FIG. 2 shows details of the construction of the machining head according to the invention. In the figure, a machining head 100 according to the invention comprises laser beam-emitting block 10 and an assist gas-jetting block 30.

The laser beam-emitting block 10 is provided for irradiating the laser beam 1 diagonally to the workpiece 5, and is composed of three beam-guiding passages 13, 14, and 16. The beam-guiding passage 14 is connected to the beam-guiding passage 13 by way of a bearing 15. The beam-guiding passage 14 bends at an angle of 90° and has reflecting mirror 21 provided at a lower-end corner of an inner peripheral surface thereof. Further, the assist gas-jetting block 30, details of which will be described later, is mounted on a bottom surface of an outer periphery of the beam-guiding passage 14. The beam-guiding passage 16 is connected to the beam-guiding passage 14 by two angle adjust screws 18 and 19. The beam-guiding passage 16 has a reflecting mirror 22 provided on an inner peripheral surface of a side wall thereof, and has a condensing lens 12 mounted on an open end thereof.

The laser beam 1 is generated from a laser oscillator, not shown, and transmitted via the beam-guiding passage 13 to the reflecting mirror 21 of the beam-guiding passage 14, by which the direction of the laser beam 1 is changed by substantially 90°. Further, by the reflecting mirror 22 of the beam-guiding passage 16, the laser beam 1 is reflected in a substantially opposite but downward direction to enter the condensing lens 12 as shown in FIG. 2. The laser beam 1 condensed by the condensing lens 12 is irradiated diagonally to the cutting point 5a on the workpiece 5.

The adjustment of a direction and an angle of irradiation of the laser beam 1 is performed in the following manner: In determining the direction of irradiation of the laser beam 1, a servomotor 20 provided on an outer wall of the beam-guiding passage 13 is driven for rotation. As the servomotor 20 is caused to rotate, the beam-guiding passage 14 rotates on the bearing 15 independently of the beam-guiding passage 13. With rotation of the beam-guiding passage 14, the beam-guiding passage 16 also rotates, thereby making it possible to adjust the direction of irradiation of the laser beam 1. In determining the angle of irradiation of the laser beam 1, the angle adjust screws 18 and 19 provided to connect between the beam-guiding passages 14 and 16 are adjusted. Through adjustment of the angle adjust screws 18 and 19, the angle of the beam-guiding passage 16 can be varied within a predetermined range, and the angle assumed by the beam-guiding passage 16 determines the angle of irradiation of the laser beam 1. Further, focusing of the laser beam 1 on the workpiece 5 can be performed by focus adjust screws 16a provided on opposite sides of the condensing lens 12.

The assist gas-jetting block 30 mentioned above has a gas nozzle 31 mounted on the bottom surface of the periphery of the beam-guiding passage 14 via a vertical position adjust screw 33. The axis of the gas nozzle 31 is made coincident with the axis of the laser beam 1 within the beam-guiding passage 13, whereby the laser beam-emitting block 10 is constructed such that it rotates about the axis of the gas nozzle 31. Therefore, the direction of irradiation of the laser beam 1 can be adjusted such that the laser beam assumes a desired angle from around the gas nozzle 31.

The assist gas 3b is supplied from a gas bomb, not shown, and introduced via a gas-introducing port 3a into the gas nozzle 31, from an open end of which the assist gas is blown perpendicularly to the workpiece 5.

The vertical position of the gas nozzle 31 with respect to the workpiece 5 can be adjusted by the vertical position adjust screw 33. Further, the horizontal position of same with respect to the workpiece 5 can be adjusted by horizontal position adjust screws 34 mounted on side walls of the gas nozzle 31.

Further, the direction of irradiation of the laser beam 1 and the point of emission of same as well as the position of the gas nozzle 31 may be manually adjusted by an operator, or alternatively automatically by a program by connecting the laser beam machine to a numerical control system.

Thus, since adjustment mechanisms are provided for adjusting the direction of irradiation of the laser beam 1 and the point of emission of same as well as the position of the gas nozzle 31 independently of each other, it becomes possible to carry out cutting or edge preparation of workpieces at various angles. Further, since there are few kinds of beveling angle for edge preparation, corresponding types of the beam-guiding passage 16 may be provided in advance, for use by replacement, as occasion demands.

As described heretofore, the present invention has construction such that a laser beam is diagonally irradiated onto a workpiece and an assist gas is blown perpendicularly against the workpiece. As a result, sufficient pressure of the assist gas is applied to the cutting point, whereby the laser beam and the assist gas cause thermal and chemical reactions of a metal to melt same, while molten metal is immediately removed by the assist gas, thus permitting diagonal cutting of the workpiece to be performed smoothly. Therefore, the present invention makes it possible to effect diagonal cutting by the use of the laser beam as required in edge preparation of steel plates having a large width, thereby dispensing with after-treatment by machining.

We claim:

1. A laser beam machine for machining a bevel in a workpiece by condensing a laser beam, comprising:

a condensing optical system for condensing and irradiating the laser beam in a diagonal direction relative to a surface of the workpiece to machine a bevel in the workpiece;

an assist gas nozzle for blowing an assist gas perpendicularly to the workpiece at a cutting point on the workpiece; and means for moving the assist gas nozzle with respect to said condensing optical system, wherein said condensing optical system is rotatable about an axis of the assist gas nozzle.

2. A laser beam machine according to claim 1, wherein said assist gas nozzle is moved with respect to the condensing optical system in a direction perpendicular to said workpiece.

3. A laser beam machine according to claim 1, wherein said assist gas nozzle is moved with respect to the condensing optical system in a direction parallel to said workpiece.

4. A laser beam machining method for machining a bevel in a workpiece by condensing a laser beam, comprising the steps of:

irradiating the laser beam in a diagonal direction relative to a surface of the workpiece and diagonally cutting a bevel in said workpiece; and blowing an assist gas perpendicularly to the workpiece at a cutting point on the workpiece.

5. A laser beam machining method according to claim 4, wherein the laser beam is irradiated in a diagonal direction relative to a surface of the workpiece at the cutting point of the workpiece.

* * * * *